Sept. 8, 1936.  W. B. JONES  2,053,996
MANUFACTURE OF WET FORMED COMPACTS
Filed June 22, 1933
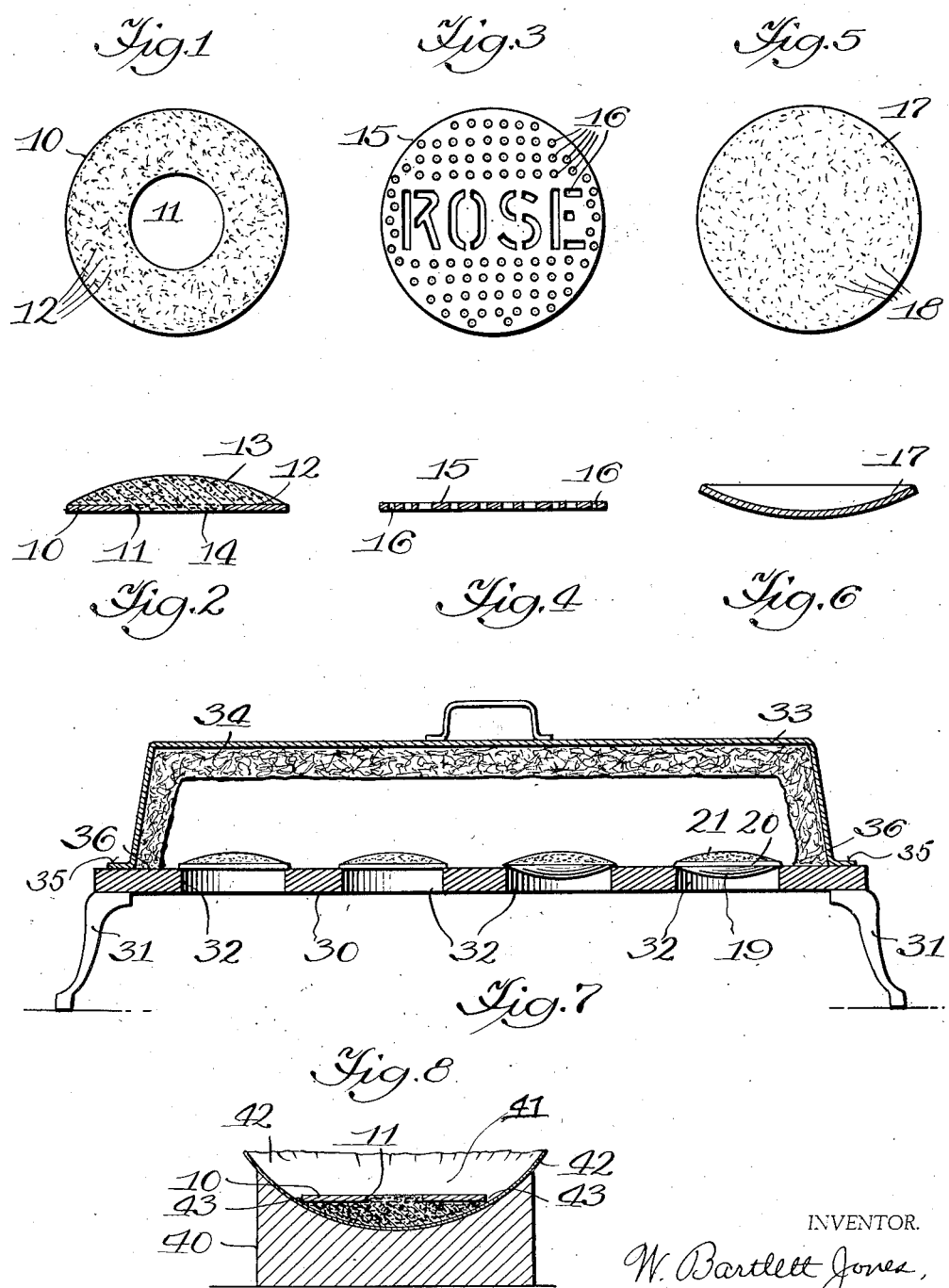
INVENTOR.
W. Bartlett Jones,
Witness:
Chas. R. Kunsh Patented Sept. 8, 1936

2,053,996

UNITED STATES PATENT OFFICE 2,053,996

MANUFACTURE OF WET-FORMED COMPACTS

W. Bartlett Jones, Chicago, Ill.

Application June 22, 1933, Serial No. 677,070

6 Claims. (Cl. 18—48)

The present invention relates to the manufacture of cosmetics such as rouge and face powder compacts. It has particular reference to the manufacture of wet-formed compacts and like cakes from wet pastes which form a surface crust on drying the forming liquid therefrom and it avoids the crust formation.

The present state of the art in the cosmetic field is well described in the Helfrich Patent No. 1,655,369, which gives a typical composition for wet-formed compacts using water as the forming-liquid, and the method of forming them. Suitable mineral ingredients selected from talc, chalk, kaolin, zinc oxide and others are compounded with or without an emollient such as mineral oil and with or without a gum binder such as gum arabic, gum tragacanth, or other soluble gum, with or without coloring agents, and water, to form a wet paste or dough. This mixture is divided into pellets and formed into a cake on a supporting base. It is common to have a dried glue or other moisture-activated adhesive already deposited on the base so that the cake on drying is very securely united adhesively to the base. Usually, the gum or binder in the composition is insufficient to effect a good union. It is important that the binder content be small so that the particles in the cake are easily rubbed off, as by a powder puff, or the fingers.

In the composition described in the Helfrich patent, the dried ingredients contain less than 0.1% of gum arabic as the binder. The Helfrich patent specifically describes the drying of that wet paste on a glued plate, and mentions the formation of a hard crust at the surface, and the removal of the crust by sand-papering.

The removal of the crust layer involves time, labor and waste of material. The present invention is based on discovery of the cause of crust-formation and the devising of methods of manufacture to prevent its formation and also to lower the cost of production and to lessen or minimize waste of material.

By means of the present invention the compacts may be formed by special drying methods so as to leave the usable surface free from a crust and directly usable without treatment, like sand-papering.

Herein I will describe the invention specifically with reference to water as the forming liquid, which is also a solvent for the gum or binder, and which activates the glue or like layer originally in dried form on the mounting plate. It will of course be understood that water is preferred as the wetting liquid, because it is cheap and practicable, and causes no vapor problem, and because it mixes nicely with minerals. It is also known to use mixtures of ethyl alcohol and water as the forming liquid, and alcohol or other volatile liquid could be used in the present invention without water or with some water, having regard for the use of a binder suitably soluble in the forming liquid.

The primary object of the invention is to dry the compact, mounted wet on a plate, away from the usable surface thereof through the body of the compact, or in other words to reverse the direction of movement of the liquid or vapor from that of the prior art.

Another object of the invention is to free the compact from forming-liquid by removing it through the plate on which it is mounted.

Still another object of the invention is the provision of a rigid mounting plate which is pervious to vapor, either by reason of one or more perforations or by reason of a porous structure.

It is also another object to provide plates of the character above described.

Still another object of the invention is the covering of the usable surface with a protective contacting material to prevent evaporation from that surface.

Another object of the invention is the exposure of the usable surface during all or the necessary part of the drying period to a non-drying atmosphere in which evaporation with crust formation cannot occur.

In order to explain the nature of the invention and to teach how it may be carried out in actual practice, I have illustrated materials and apparatus which may be used to carry out the invention in several ways, as shown in the accompanying drawing in which:

Fig. 1 represents an annular plate for receiving compact composition.

Fig. 2 represents a cross-section of a finished compact on a plate like that of Fig. 1.

Fig. 3 represents a perforated plate showing a name in perforate form.

Fig. 4 is a cross-section of a perforated plate.

Fig. 5 represents a porous plate covered with a glue in dried form.

Fig. 6 is a cross-section of the plate of Fig. 5.

Fig. 7 is a cross-section of a drying box for the invention consisting of plate and cover.

Fig. 8 is a cross-section of a circular mold in which compacts may be finally shaped.

I have found that the crust is formed by the creeping of solution, such as in water, containing dissolved materials from within the body of the paste to the surface which is exposed to drying conditions. As the exposed surface is first dried it is less wet than the interior, and hence the liquid on the interior flows to the drier part. Where water is used and gum is present, such as gum arabic, which is soluble, it also moves with the water. Any soluble material, and even dissolved quantities of the minerals or any impurities therein, will thus tend to move to the surface where they must of course be deposited. It is this concentration which causes the crust, or surface layer which is harder than the inner layer. In the instances where color, such as dyes, are present which are not totally insoluble, the color also is concentrated, and the surface shade is darker than the interior shade. In such cases the highly colored crust must be removed even though it should be sufficiently friable to be readily rubbed off.

In order to avoid the crust formation I reverse the direction of drying and dry through the plate or base side of the compact, thus drawing forming-liquid from the usable surface of the compact. The residues which are deposited are left at the bottom of the product where they are invisible and are never reached in the ordinary use of a compact.

One method of making compacts will first be described as a slight alteration from the ordinary well known methods. The compact may be formed in the usual way, using only enough paste, and slightly less than used heretofore, to make the standard size. It may be initially fashioned to ultimate shape and size. In Fig. 1 I show a ring 10, as of metal with a single hole 11 therein, preferably at the center. This may be used as the base plate. Glue 12 is indicated therein to receive the wet paste. Other adhesive may be used which is activated by the forming liquid. Fig. 2 represents in cross-section a compact made on plate 10, having paste 13 extending into hole 11 as shown at 14.

Figs. 3 and 4 represent a plate 15 having numerous small holes 16 therein. Otherwise it resembles plate 10. The small holes may be arranged in letter form, so as to give the name of the dealer, or the trade name of the compact. Thus when the cake is all used and the plate is exposed, the plate will show the name as a suggestion for duplicating purchase of the same material.

Figs. 5 and 6 represent a further diminution in the perforate character of the plate. These represent a porous substance 17, such as a piece of fiber, fiber board, porous clay or any like substance which will remain fixed during the process and permit moisture vapor to pass through it. When fibers or like material are used which swell when wet, these may be water-proofed in such a way as to render them moisture pervious, it being understood that proofness to water and to moisture are distinctive properties. In using a porous plate as of clay, any glue used thereon should of course transmit the moisture so that drying can be effected. A water soluble glue 18 is shown.

It is also to be observed that the plates may be other than circular, and other than flat. Hexagonal forms are well known. Dished forms of various shapes are also used. The plate or mounting may have a flange encompassing the edge of the compact mass, as is well known in the art. This is shown in Fig. 7 by the dished mounting base 19 with flange 20 enclosing compact mass 21.

To dry the wet compacts on any of the moisture-pervious bases, one method is to follow the prior art practice of resting them base-side down on a support to dry at ordinary temperature. For this invention the base is supported over a channel or passage into which the moisture escapes through the base, and the exposed compact mass is surrounded with a medium in which evaporation does not at all or readily occur.

One practical way to do this is shown in Fig. 7. A raised shelf such as a board or plate 30 is supported by legs 31 to provide a space beneath it for circulation of air. Holes 32 are formed in the shelf slightly smaller than the mounting plates of the compacts. Care is taken to have the hole and plate fit neatly so that the joint is fairly well sealed. Packing means can be supplied as required. Compacts are shown on the holes to dry through the holes. To prevent drying through the top of the compact a cover 33 is placed over the compacts and on the shelf. In the cover a moist atmosphere is maintained. This is best done by keeping it saturated with moisture through the medium of a moist pad secured to the cover. I prefer to use a lining of rubber sponge 34 over the entire inside of the cover, and to extend it slightly below the supporting edges 35 of the cover, as at 36, whereat it is compressed as a sort of seal for irregularities of fitting between the shelf and cover.

Compacts so dried have a top layer devoid of crust. When dried they are ready for use without further treatment or trimming.

Another method of carrying out the invention affords many savings in the process of formation and provides an improved product. A mold is formed in which the compact is shaped. The mold is designated at 40 as a spherical recess for a round compact, and the available working area is preferably greater than the area desired in the compact. A curvature comparable to a diameter of 2½" to 3" makes an average size compact of 1½" diameter. The mold may be lined or unlined. If unlined it is best to let the paste reside in the mold during drying, or to transfer it to another similar shaped receiver. I prefer to line it with an impervious sheet, such as metal foil pressed to fit the curvature without wrinkles, as shown at 41. Edges of the foil extend beyond the area of the compact as at 42. Into the mold a pellet of paste is placed, having at least enough material to form the compact. The perforated bases are preferred. The base 10 is simply pressed upon the pellet, at no exact angle, until the plate contacts the mold. If there is just enough paste, there will be no waste. If there is a slight excess it will be extruded at the perforation 11 and possibly about the edge 43. Excess can be wiped away either before or after drying, preferably after, as the removal is more neatly effected without smearing paste about. The compact encased in foil may be left in the mold to dry, or the foil may be removed from the mold and set aside to dry. Drying is enforced through the hole 11 in plate 10, and perhaps at the edges. To prevent drying at the compact edge the excess foil 42 may be folded over the plate while it is in the mold, as a lock between the foil and its contents. When it is dry, the compact is ready for market and its face is protected.

A further improvement in this particular method of manufacture consists in providing the mold body 40 of hard material, at least at the surface. This may be done by chromium plating. The plate which is then used should have a sharp square edge, and should be forced by sufficient mechanical pressure to cut through or seriously weaken the foil. The foil will thus be in intimate and sealing contact with the edge. Cutting pressure is preferred so that the compact can be lifted off and be dried with a close-fitting foil cover thereon and a trimmed edge. Thus there is less handling and no further manipulation of the extending edges of the foil.

Another advantage of the use of foil is in the fact that any markings in the foil appear on the compact. A linen mark can be made, or a trade name may be impressed, or embossed in the foil, and the same reproduced at the compact surface. The metal foil easily peels from the dried compact mass so that no difficulty is encountered.

It is one disadvantage of the prior art wet methods of manufacture that a trade name cannot be left on the compact, as it can be in the dry-forming process of pressing "pills" from moist powder.

Wherein the base plate is referred to as pervious to vapor, it is intended to include all the forms illustrated, including those forms which have many perforations or a single hole.

It will be understood that there may be various modifications of the invention and of the various processes and materials herein specifically described, without departing from the spirit and scope of the invention as expressed in the appended claims.

I claim:

1. The method of drying forming-liquid from a wet preformed cosmetic compact of powder or rouge containing liquid solution in the compact composition, which comprises mounting said compact mass on a carrying base which is pervious to permit drying out of said liquid therethrough, and evaporating the liquid from the base or mountable side of said compact through said pervious base, while avoiding evaporation from the top or useful side of the compact.

2. The method of making a wet-formed compact from wet cosmetic paste for powder and rouge compacts, which consists of forming the compact while wet with volatile forming liquid on a rigid base which is pervious to vapor of said liquid, exposing the paste side to a non-drying atmosphere for said liquid, and exposing the base to a drying atmosphere.

3. The method of making a wet-formed compact from wet cosmetic paste for powder and rouge compacts, which consists of forming the compact while wet with a volatile forming-liquid on a rigid base which is pervious to vapor of said liquid, covering the paste side with a contacting cover to prevent evaporation therefrom, and evaporating liquid from the base side.

4. A mounted cosmetic compact comprising a mounting base plate characterized by rigidity and perviousness to vapor, and a cosmetic compact mass adhesively united to said plate and dried in situ thereon with resulting adhesion thereto, said compact mass being characterized by crust-forming ingredients therein being increasingly concentrated toward said base in the drying in situ.

5. A mounted cosmetic compact comprising a mounting base plate characterized by rigidity and perforations, and a cosmetic compact mass adhesively united to said plate and dried in situ thereon with resulting adhesion thereto, said compact mass being characterized by crust-forming ingredients therein being increasingly concentrated toward said base in the drying in situ.

6. A mounted cosmetic compact comprising a mounting base plate characterized by rigidity and a single hole therein of substantial size, and a cosmetic compact mass adhesively united to said plate and dried in situ thereon with resulting adhesion thereto, said compact mass spanning said hole, and being characterized by crust-forming ingredients therein being increasingly concentrated toward said base in the drying in situ.

W. BARTLETT JONES.